United States Patent
Pirro et al.

(10) Patent No.: US 6,886,314 B2
(45) Date of Patent: May 3, 2005

(54) DEVICE FOR MEASURING AND/OR CHECKING THE DISTANCE BETWEEN A SHEAR BAR AND A CHOPPING KNIFE

(75) Inventors: Peter Pirro, Wallhalben (DE); Steffen Clauss, Rieschweiler-Mühlbach (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/765,362

(22) Filed: Jan. 27, 2004

(65) Prior Publication Data

US 2004/0182061 A1 Sep. 23, 2004

(30) Foreign Application Priority Data

Jan. 30, 2003 (DE) .......................... 103 03 504

(51) Int. Cl.⁷ ................................. A01D 75/28
(52) U.S. Cl. ..................................... 56/10.2 R
(58) Field of Search .................. 56/10.2 R, 10.2 D, 56/10.2 E, 16.4 A, 247, 16.4 R

(56) References Cited

U.S. PATENT DOCUMENTS

| | | | | |
|---|---|---|---|---|
| 3,769,666 A | * | 11/1973 | Kaufman | ................ 26/15 R |
| 4,205,797 A | * | 6/1980 | Bennett et al. | ............ 241/222 |
| 4,799,625 A | * | 1/1989 | Weaver et al. | ............. 241/30 |
| 4,934,612 A | * | 6/1990 | Johnson | .................. 241/37 |
| 6,255,812 B1 | * | 7/2001 | Voigt et al. | ............ 324/207.26 |

FOREIGN PATENT DOCUMENTS

| | | |
|---|---|---|
| DE | 41 34 957 A | 4/1993 |
| DE | 43 35 786 A | 4/1995 |
| DE | 43 35 786 | 4/1995 |
| DE | 199 03 153 C | 3/2000 |
| EP | 0 706 752 | 4/1996 |
| EP | 0 706 752 A | 4/1996 |
| EP | 0 943 888 A | 3/1999 |
| GB | 2 312 958 | 11/1997 |

* cited by examiner

*Primary Examiner*—Robert E. Pezzuto
*Assistant Examiner*—Alicia Torres

(57) ABSTRACT

A crop chopping arrangement for a forage harvester includes a shearbar mounted adjacent a path swept by chopping knives of a chopper drum and being selectively adjustable toward and away from said path so as to adjust the distance between the shearbar and knives as they pass by the shearbar. An arrangement for measuring and/or checking the distance between the shearbar and the knives includes a vibration sensor located to measure the mechanical vibrations in the shearbar produced by the moving knives, and an electronic evaluation circuit. The evaluation circuit is operable for performing a frequency analysis of the signal provided by the vibration sensor so as to derive information indicative of the distance between the shearbar and knives.

8 Claims, 2 Drawing Sheets

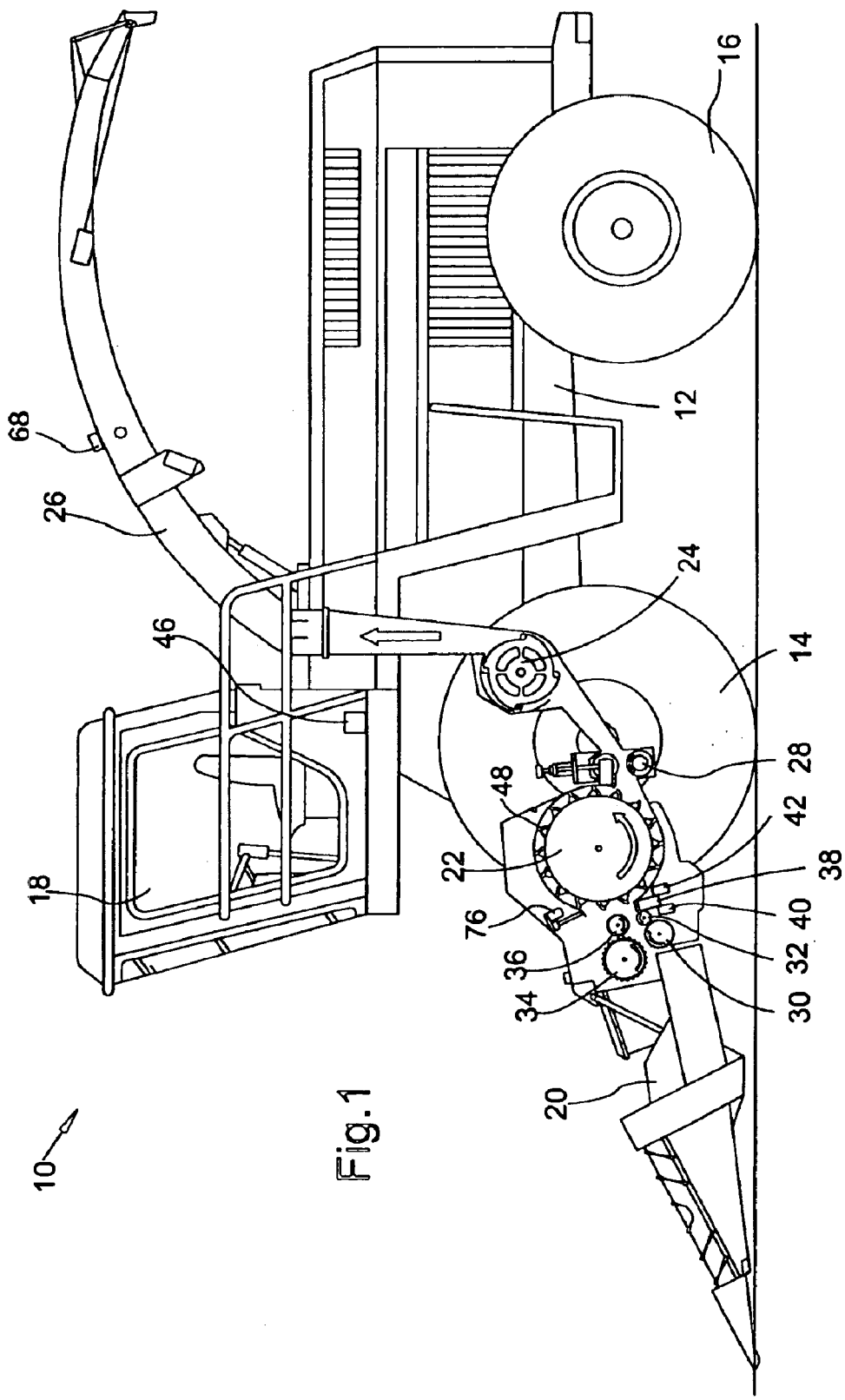

DEVICE FOR MEASURING AND/OR CHECKING THE DISTANCE BETWEEN A SHEAR BAR AND A CHOPPING KNIFE

FIELD OF THE INVENTION

The invention refers to a device for measuring and/or checking the distance between a shearbar and a chopping knife that can move with respect to the shearbar. The device comprises a vibration sensor arranged to measure mechanical vibrations produced in the shearbar by the moving knife and an electronic evaluation circuit connected to the vibration sensor.

BACKGROUND OF THE INVENTION

For field choppers, the distance between the chopping knives and the shearbar is an important parameter for the quality of the cut and the power applied for cutting. Such shearbars are usually adjustable by electromotors relative to the chopping drum. A series of devices has been proposed (DE 41 34 957 A, DE 43 35 786 A, EP 0 706 752 A), which include a knocking sensor that is attached to the shearbar and whose output signal is a function of the distance between the shearbar and the chopping knives. For these devices, the output signal of the knocking sensor is supplied to a low-pass filter and the amplitude is used to decide whether or not the shearbar is sufficiently close to the chopping knives. It is considered a disadvantage that selection of the amplitude for which the distance is considered to be correct is very critical. If it is selected to be too small, the distance is too large; if it is selected to be too large, collisions between the chopping knife and the shearbar are possible. However, the amplitude of the knocking sensor signal also depends on other conditions, such as the state of the sensor, etc.

Furthermore, to measure the distance between the shearbar and the chopping knives, magnetic sensors are known that include a permanent magnet connected to the shearbar and an induction coil in which an electromotive force (EMF) is induced when the chopping knife brushes past. This electromotive force is amplified and then detected. In such a device, which is described in EP 0 943 888 A, the induced voltages are subjected to frequency analysis. The ratio of the high-frequency portions of the signal spectrum to the low-frequency portions is taken. The quotient determined in this way provides information on the distance between the shearbar and the chopping knives. The requirement of using a permanent magnet, which can disturb the functioning of a metal detector arranged close to the shearbar, is considered a disadvantage.

In DE 199 03 153 C it is proposed to measure the forces exerted by the chopping knife on the shearbar, and to determine the sharpness of the chopping knife with reference to the measured values.

In the article "Messverfahren zur Feststellung des Scharfezustandes der Paarung Häckselmesser/Gegenschneide eines Feldhäckslers [Measurement method for determining the sharpness condition of the chopping knife/shearbar pair of a field chopper]" by A. Heinrich and G. Bernhardt, published in Conference: Agricultural Engineering, meeting in Halle/Saale [Germany], Oct. 10–11, 2002 (VDI-MEG) on pages 325–330, another method for determining the sharpness of chopping knives is proposed. The acceleration of the shearbar is detected and input to a frequency analysis. Using the harmonic wave spectrum, it can be determined whether the chopping knives are still sufficiently sharp or not.

The two references previously mentioned present possibilities for determining the sharpness of chopping knives, but they give no information on measuring the distance between shearbars and chopping knives.

The invention is based on the problem of disclosing a device, improved relative to the prior art, for determining the distance between a shearbar and chopping knives that can move relative to the shearbar.

SUMMARY OF THE INVENTION

According to the present invention, there is provided an improved device for measuring the distance between knives of a chopping drum and a shearbar.

An object of the invention is to provide a device for measuring the distance between knives of a chopping drum and a shearbar, the device including a vibration sensor and an evaluation device to perform a frequency analysis os the signal provided by the vibration sensor so as to derive information on the distance between the shearbar and the chopping drum knives.

The present invention uses the fact that the mechanical vibrations generated in the shearbar by the chopping knife or by the chopping knives exhibit not only different amplitudes but also different frequency spectra when the distance between the shearbar and the chopping knives changes. The mechanical vibrations are detected by a vibration sensor on the shearbar or on an adjacent component, and the signals provided by the vibration sensor are input to an evaluation device where a frequency analysis is performed. The results of the frequency analysis are used to derive information on the distance between the shearbar and the chopping knife. The device according to the invention can measure the distance, i.e., can generate a distance measurement value, and/or can check the distance, i.e., can make a comparison with a desired value.

This method produces information on the distance between the shearbar and the chopping knife. This information is independent of the amplitude of the signal of the vibration sensor and is thus less susceptible to errors. However, the evaluation device can also take into account the amplitudes of the signals of the vibration sensor for determining the distance information.

The vibration sensor is preferably a vibration sensor that can detect the acceleration of the shearbar. Such vibration sensors can detect the motion of a mass that is spring-mounted or in some other way elastically suspended relative to the shearbar. A microphone or any other suitable vibration sensor can also be used to detect the mechanical vibrations of the shearbar.

The frequency spectrum of the signal provided by the vibration sensor also contains information on the sharpness of the chopping knife. This information can be extracted by the evaluation device from the signal of the vibration sensor. If this information reveals that the sharpness of the knife has fallen below a threshold, the operator can be notified accordingly so that he can perform or arrange for sharpening, and/or a sharpening process can be automatically performed.

The evaluation device supplies a signal that contains information on the distance between the shearbar and the chopping knife. This information can be a concrete distance value and/or merely information as to whether the shearbar is sufficiently close to and/or far from the chopping knives. This information can be used to notify the operator, according to a visual, acoustic or some other method, as to whether it would be advisable to readjust the position of the shearbar. As an alternative or in addition, it is possible, if the evaluation device provides information that indicates adjustment of the shearbar would be advisable, for an automatic adjustment of the shearbar relative to the chopping knife or vice versa, to be performed, if desired, even during the chopping operation. Due to the always optimal cutting gap, the chopping knife wears out more slowly so that it has to be sharpened less frequently and its service life is prolonged.

The information on the sharpness of the chopping knife, which is preferably also derived from the frequency spectrum of the signal of the vibration sensor, can also be taken into account for the decision as to whether an adjustment of the shearbar is advisable, because the sharpness also affects the frequency spectrum of the vibrations of the shearbar.

The parameters of the particular crop being harvested can also affect the vibrations of the shearbar. Thus, a dry crop can be significantly harder than a soft crop, which causes different vibration spectra of the shearbar. In addition, the most favorable distance between the shearbar and the chopping knife can depend on the crop parameters. Coarse crops, such as, e.g., thin tree trunks, can require a larger distance between shearbar and chopping knife than finer crops, such as, e.g., grass. In a preferred embodiment of the invention, the evaluation device receives information on at least one parameter of the crop, which is taken into account for the decision as to whether an adjustment of the shearbar is advisable. The information on the crop parameter can be input by hand and/or audibly by the operator through an input device. It is also conceivable to detect this information through a suitable crop parameter sensor and to supply the measured value from the crop parameter sensor to the evaluation device.

The evaluation device preferably first performs a Fourier transform on the signals of the vibration sensor in order to derive the frequency spectrum. A comparison with reference data can then be performed, which enables a decision as to whether an adjustment of the shearbar is advisable.

BRIEF DESCRIPTION OF THE DRAWINGS

The drawings illustrate an embodiment of the invention described in more detail in the following.

FIG. 1 is a schematic, left side view of a harvesting machine on which the device according to the invention can be used.

DESCRIPTION OF THE PREFERRED EMBODIMENT

Figure 3:
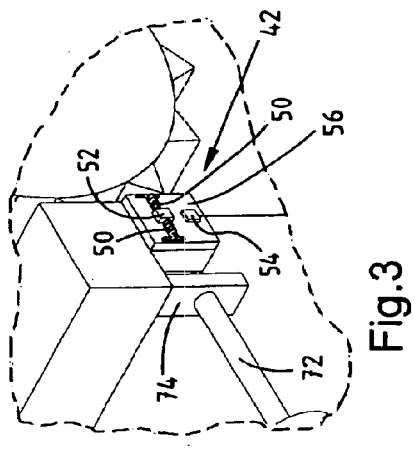
FIG. 3 is an enlarged view of the structure shown in FIG. 2 for mounting and adjusting the right-hand end of the shearbar.

A harvesting machine 10, shown in FIG. 1 in the form of a self-propelled field chopper, is built on a frame 12 that is supported by front and rear wheels 14 and 16. Operation of the harvesting machine 10 is performed from a driver's cab 18, from which a crop pick-up device 20 can be seen. Material picked up from the ground by means of the crop pick-up device 20, e.g., corn, grass, or the like, is fed to a chopping drum 22 that is equipped with chopping knives 48 and that chops the crop into small pieces and discharges the crop to a conveyor device 24. The material leaves the harvesting machine 10 through a rotatable discharge chute 26 to a trailer traveling close by. A re-chopping device 28, through which the material of the conveyor device 24 to be conveyed is fed tangentially, extends between the chopping drum 22 and the conveyor device 24.

Between the crop pick-up device 20 and the chopping drum 22, the material is transported through bottom pre-pressing rolls 30, 32 and top pre-pressing rolls 34, 36. The knives distributed over the circumference of the chopping drum 22 interact with a shearbar 38 in order to chop the material. The shearbar 38 is provided with an adjustment device 40 that is designed to move the shearbar 38 horizontally towards and away from the chopping drum 22. It is used to adjust the cutting gap. There is a vibration sensor 42 on the shearbar 38.

Figure 2:
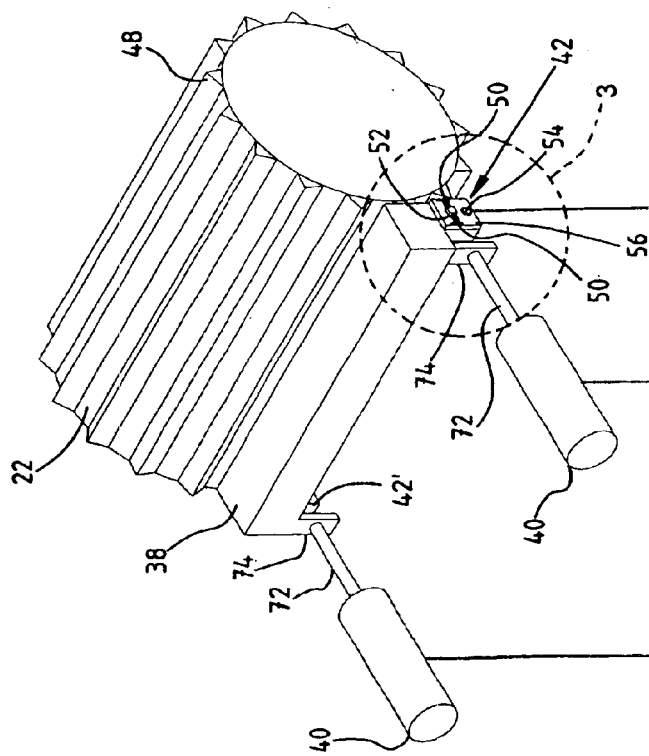
FIG. 2 is a schematic illustration of a sensing system constructed in accordance with the invention.

The device for measuring the distance between the shearbar 38 and the chopping knives 48 of the chopping drum 22 is shown in more detail in FIGS. 2 AND 3. The vibration sensor 42 attached to the shearbar 38 includes a mass 52 suspended on springs 50. The position of this mass can be detected by a position sensor 54 that operates, e.g., capacitively or inductively. If the shearbar 38 accelerates, the preferably detachable housing 56 of the vibration sensor 42 also accelerates, while the mass 52 initially remains stationary due to its inertia, and is set into motion only after a delay due to its suspension on the springs 50. The relative motion between housing 56 and mass 52 is detected by the position sensor 54. In FIG. 2, the vibration sensor 42 detects vibrations running in the adjustment direction of the shearbar 38. It would also be conceivable, as an alternative or in addition, to detect vibrations in the direction perpendicular to the previously mentioned direction, thus in the vertical direction in FIG. 2. Vibrations in the longitudinal direction of the shearbar 38 could also be detected. Instead of the illustrated vibration sensor 42, a conventional knocking sensor could also be used, since it is also used for detecting vibrations.

As indicated in the drawing, vibration sensors 42, 42' can be arranged at both ends of the shearbar 38 (or at arbitrary positions in-between). The output signals of the position sensors 54 of the vibration sensors 42, 42' are input to an evaluation device 46, which is arranged, e.g., in the driver's cab 18. The evaluation device includes an analog/digital converter 58 which digitizes the incoming signals. They then undergo digital processing, which can be performed by a microprocessor, which realizes the following functions: computing Fourier transform 60, comparing with a reference spectrum 62, and acting as a driver 64 for the motors of the adjustment device 40. However, it is also conceivable to assign each of the functions mentioned to special circuits.

The digitized signal from the vibration sensors 42 is first subjected to a Fourier transform 60, so that a frequency spectrum is obtained. The latter can be updated regularly. The frequency spectrum of the vibration sensors contains information on the distance between the shearbar 38 and the chopping knives 48 and on their sharpness, because both parameters affect the mechanical vibrations excited in the shearbar 38. A reference spectrum is stored in a memory 66, which corresponds to a frequency spectrum for sharp knives and an optimal distance between shearbar 38 and chopping knives 48 (preferably detected with existing means). A comparison between the reference spectrum from the memory 66 and the measured spectrum is performed in a processing step or in a circuit 62, whose result contains information on whether the shearbar 38 is sufficiently close to the chopping knives 48 or if it should be moved closer or farther away.

Information from a crop parameter sensor 68 is also taken into account for the comparison 62. In the embodiment shown, the crop parameter sensor 68 is arranged on the discharge chute 26 and can detect, e.g., the moisture of the crop, wherein microwave radiation can be used. Other crop parameters, such as the type of crop, can be input by an input device 78 in the driver's cab 18, and are also taken into account during the comparison 62. Thus, memory 66 can store spectra that correspond to the particular crop parameters and that are retrieved for comparison 62 according to the current crop parameters.

Depending on the result of the comparison 62, a confirmation is given to the operator in the driver's cab 18 by means of a display device 70 if the distance between the shearbar 38 and the chopping knives 48 has been set sufficiently exactly. Conversely, if an adjustment proves to be advisable, the adjustment devices 40, each of which is arranged at one end of the shearbar 38, are activated by the driver 64. The adjustment devices 40 comprise motors that can be operated to rotate threaded shafts 72. The threaded shafts 72 pass through threaded elements 74 connected to the shearbar 38, so that the adjustment devices 40 can adjust the shearbar 38 in the direction towards and away from the chopping drum 22.

The two adjustment devices 40 can be controlled differently, depending on the differences in amplitudes, spectra, and/or time profiles of the signals of the vibration sensors 42, 42', in order to bring both ends of the shearbar 38 to optimal distances from the chopping knives 48.

The comparison 62 can also determine whether the chopping knives 48 are still sufficiently sharp. If this is not the case, a sharpening device 76 can be automatically set in operation by the evaluation device 46.

Having described the preferred embodiment, it will become apparent that various modifications can be made without departing from the scope of the invention as defined in the accompanying claims.

What is claimed is:

1. In a combination including a chopping drum equipped with a plurality of chopping knives arranged about its periphery and rotatable to move said knives so as to trace a path located adjacent a shearbar, with said shearbar being mounted for movement toward and away from a path traced by said knives, a vibration sensor located for detecting mechanical vibrations generated in said shearbar by said chopping knives and producing a signal relating to a strength of said vibration, and an electronic evaluation device connected to said vibration sensor, the improvement comprising: said evaluation device including a frequency analysis circuit for analyzing said signal provided by said vibration sensor, and to derive information on the distance between said shearbar and said chopping knives from said analysis.

2. The combination, as defined in claim 1, wherein said vibration sensor is designed to detect the acceleration of said shearbar.

3. The combination, as defined in claim 1, wherein said evaluation device is operable to derive sharpness information, relating to said chopping knives, on the basis of said frequency analysis of said signal provided by said vibration sensor.

4. The combination, as defined in claim 3, wherein an operator signal device is coupled to said evaluation device; and said evaluation device operating to perform at least one function of: a) sending a signal, containing information relating to sharpness of said knives, to an operator, and b) automatically triggering an adjustment of said shearbar.

5. The combination, as defined in claim 4, wherein a crop parameter signal is supplied to said evaluation device; and said evaluation device taking into account said crop parameter signal in performing said at least one function.

6. The combination, as defined in claim 1, wherein an operator signal device is coupled to said evaluation device; and said evaluation device operating to perform at least one function of: a) sending a signal, containing information relating to the distance between said shearbar and said chopping knives, to an operator, and, b) automatically triggering an adjustment of said shear bar relative to said chopping knives.

7. The combination, as defined in claim 6, wherein a crop parameter signal is supplied to said evaluation device; and said evaluation device taking into account said crop parameter signal in performing said at least one function.

8. The combination, as defined in claim 1, wherein said evaluation device includes an information storage memory in which is stored reference data related to a desired spacing distance between the shearbar and the chopping knives; and said frequency analysis circuit being operable to subject said signals of said vibration sensor to a Fourier transform and to compare the transformed signals with said reference data contained in said memory.

* * * * *